Feb. 2, 1960  E. W. FUSS ET AL  2,923,574
DISTRIBUTING MEANS WITH SPINNER FOR GRAIN
Filed Sept. 12, 1957  3 Sheets-Sheet 1

Feb. 2, 1960     E. W. FUSS ET AL     2,923,574
DISTRIBUTING MEANS WITH SPINNER FOR GRAIN

Filed Sept. 12, 1957     3 Sheets-Sheet 3

United States Patent Office 2,923,574
Patented Feb. 2, 1960

2,923,574
DISTRIBUTING MEANS WITH SPINNER FOR GRAIN

Eric William Fuss, Jarvis Rogers Fuss, and Roy Muller Fuss, Tintinara, South Australia, and Albert Fuss and Albert Keith Fuss, Dalby, Queensland, Australia Application September 12, 1957, Serial No. 683,518

Claims priority, application Australia September 13, 1956

1 Claim. (Cl. 302—28)

This invention relates to distributing means for grains, and other substances.

At the present time grain is distributed by agricultural seeding machines which carry the grain in a seed box from which it is fed by a series of independent distributors to tubes which lead it to the ground or into furrows or the like.

It has been found that considerable inconvenience, waste of time and effort, is caused by the particular design of the grain boxes and by the continual blocking and uncertainty of equal distribution for the different varieties of seed sown. Also the weight of the present units appears to be unnecessary and the cumbersome construction of the grain boxes and machine parts adds to the cost of manufacture as well as servicing.

It has also been a problem to thoroughly clean the grain boxes and distributors when changing from one variety of grain or seed to another and it is therefore the object of this invention to provide a more convenient feed device for better distribution of all kinds of grain and grasses and to give a more positive sowing action with a considerable reduction in weight and constructional parts by eliminating the existing box, distributors and general mechanisms.

Older grain distributors are known which use a revolving wheel to throw the grain outwards without directing means so that the grain is broadcast through a wide arc, and that principle is used to the present day with super distributors where revolving blades are used to throw the powdered material outwardly.

Our invention utilizes a revolving member or spinner to cause accurate distribution but this member is of special shape and instead of throwing the material outwardly on to the ground, serves to direct it into delivery tubes where an air blast conveys the materials to specific localities at the terminal ends of the tubes.

According to our invention therefore a bowl shaped chamber is provided with a series of ports from which distributing tubes radiate, a spinning device being located inside of this bowl which receives and distributes the grain to the various ports, the unit including a fan which is isolated or separate from the distributor and which directs a blast of air to these ports so that the flow of air assists the movement of the grain or seed down and through the tubes which connect to the ports.

It will be realised that this form of distributor can be considerably varied in its construction but to enable the invention to be fully understood, embodiments thereof will be described with reference to the accompanying drawings in which.

Figure 1:
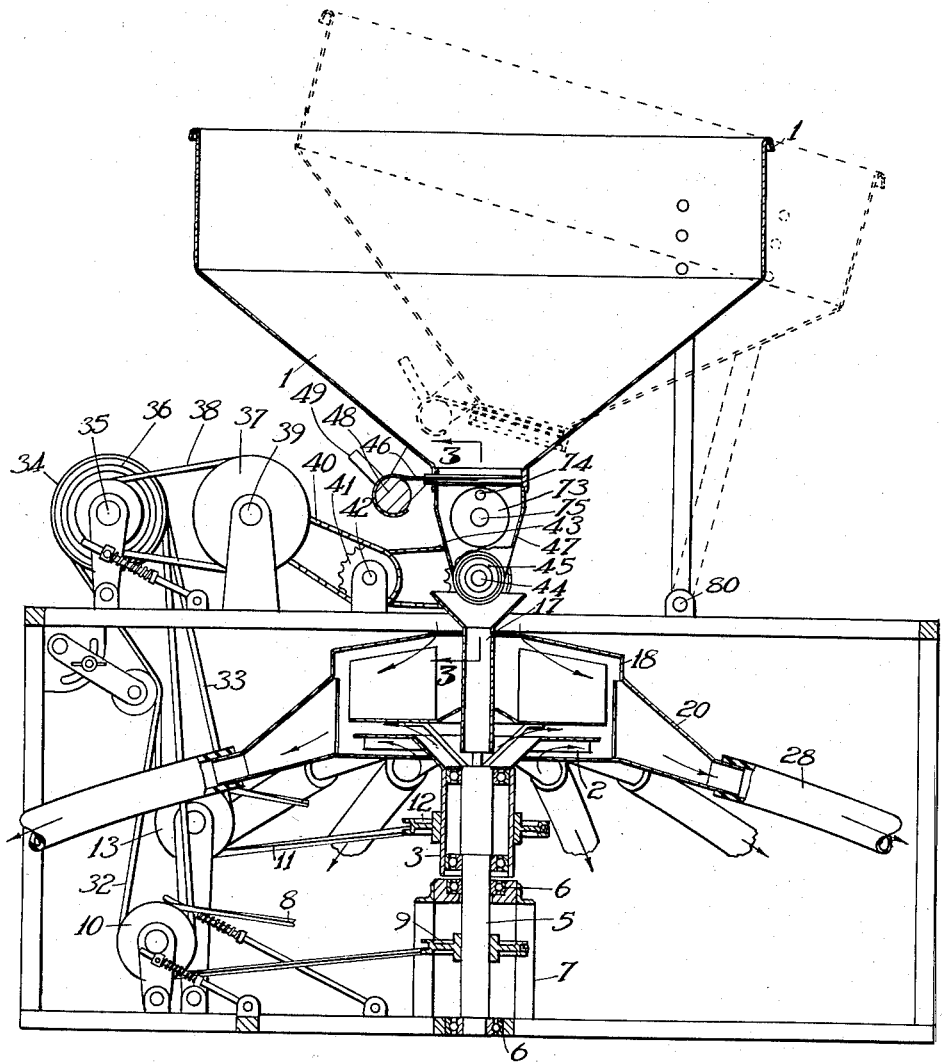
Fig. 1 is a sectional side elevation of such a distributor.

The grain is fed from a hopper 1 into a spinner 2 which is mounted on the vertical axle 3, the axle 3 being shown hollow and supported on bearings 4 in relation to a shaft 5 which is in turn supported in bearings 6 in a frame 7, the arrangement thus being one which ensures that the rotatable shaft 5 can be separately driven by means of a belt 8 and pulleys 9 and 10, whereas the hollow shaft 3 can also be driven by means of a belt 11 through pulleys 12 and 13.

The spinner 2 is joined to the hollow shaft 3 by means of a somewhat conical distributor member 15 which has its lower end closed but terminates in a flat plate or disc 16 so that grain or other material fed into the conical distributor member 15 through a chute 17 which is coaxially arranged with the shaft 5 and the hollow shaft 3, is spun outwardly in the conical distributor member and moves upwardly on the conical surface thereof to discharge uniformly at its upper end on to the plate 16 from which it is then distributed into the bowl 18 and from this bowl by means of the series of openings 19 to chutes 20 which are equally spaced around the periphery of the bowl 18.

On the underside of the plate 16 of the spinner 2 are fan blades 22 while above the plate 16 is a further plate or disc 23 which carries on it fan blades 24 so arranged that air will be drawn into the bowl 18 through the opening 25 and will be directed to the inner surface of this bowl and distributed from there through the chutes 20. The bottom plate of the bowl 18 is centrally apertured to allow an inflow of air to the fan blades 22.

The plate 23 which carries the fan blades 24 is connected to the shaft 5 by means of inclined spiders 26 so that the fan 23, 24 is revolved with the shaft 5, but the spiders provide an open space so that grain and similar material passing down the chute 7 can fall into the bottom of the conical distributor member and can pass outwardly to the sloping wall thereof to move up this wall to be finally discharged into the space 27 formed between the plate 16 and the plate 23.

The action of this distributor is that grain and the like passes down the chute 17 and is uniformly spread by means of the conical distributor member 15 and discharged into the space 27 between the plates 16 and 23 so that the grain is thrown from this space 27 into the chutes 20 with uniform distribution, the grain being conveyed along the chutes and into tubes 28 which join thereto but being carried along the tubes 28 by the air blast provided by the blades 24 of the fan 23, 24 and also helped by the air from the blades 22 on the plate 16.

The plate 23 has a skirt 30 which makes a relatively close seal with the feed tube 17 so that the air for the fan enters principally through the opening 25 between the edge of the cover member 31 of the bowl 18 and the outer periphery of the tube 17.

It is of course not necessary to use independently driven shafts 3 and 5 for the spinner 2 and the fan 23, 24 respectively. If these are arranged so that they may be driven at the same speed, the shaft 5 can support both of the members.

The drive for the pulleys 10 and 13 is taken by means of belts 32 and 33 which engage pulleys 34 on a main drive shaft 35, the drive shaft 35 having on it also a stepped cone pulley 36 from which a stepped cone pulley 37 is driven by means of a belt 38, this pulley 37 being mounted on a shaft 39 which is connected by means of a chain 40 to a sprocket 41 on a shaft 42, the shaft 42 having a sprocket and chain connection 43 to the shaft 44 of a worm 45 which is contained in the bottom of a housing 46 into which the material to be fed is discharged from the hopper 1.

A clutch 47 is provided to stop the drive to the feed spiral 45.

A shutter 46 across the base of the hopper 1 allows control of the material into the housing 47, the shutter preferably being of the flexible type operated from a drum 48 which may be appropriately moved by a lever 49.

The distributor tubes 28 lead to any suitable type of discharge mechanism such as the boot of a tyne or the tubes can discharge directly onto the ground but it will be clear that because of the use of a relatively heavy air blast which will move the materials along the distributor tubes 28, the length of these tubes can be considerable and discharge can therefore take place at any selected point in relation to the hopper 1 even should such points be a very considerable distance therefrom.

It will also be clear that because of the use of a strong air current to convey the materials along the distributor tubes 28 after they have been fed into the tubes in regulated quantities by the conical distributor member, will ensure that materials of varying types from solid grain to fibrous material or super or the like can conveniently be handled, the air current picking up such materials and moving them along the chutes to discharge points.

Figure 4:
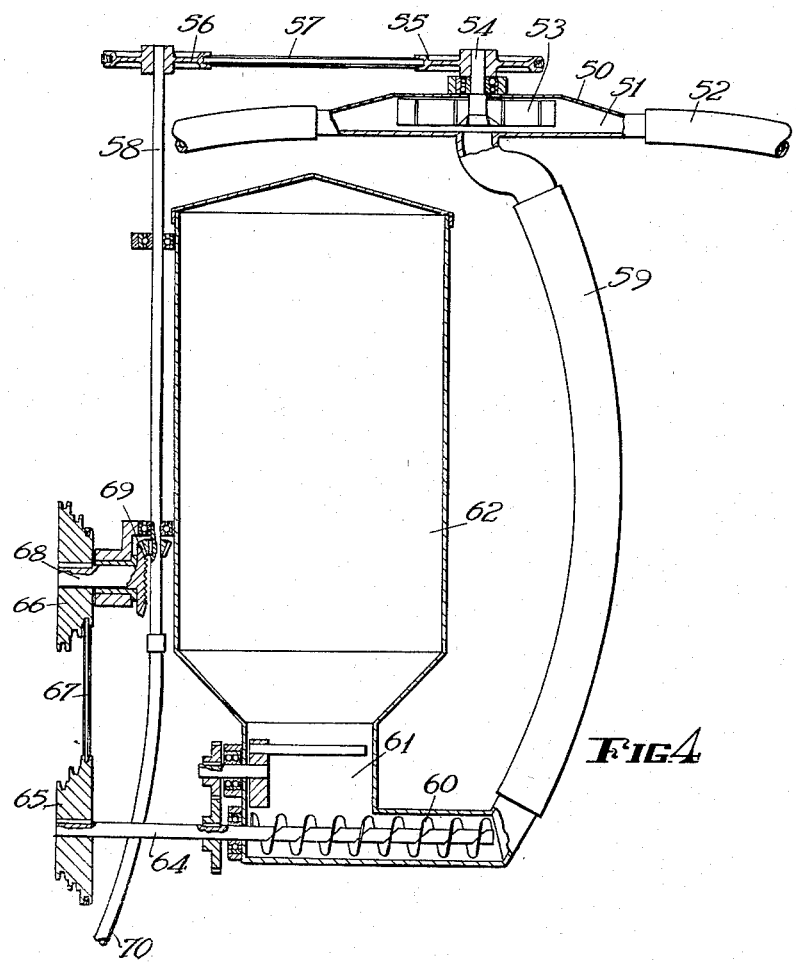
Fig. 4 is a sectional side elevation of a modified form of the unit.

In the modification shown in Fig. 4 the mechanism is somewhat reversed in that the bowl, which is here designated 50, is again supplied with chutes 51 joining to distributor tubes 52, but in this case a fan 53 is mounted on a shaft 54 which is driven by means of a pair of pulleys 55 and 56 and belt 57 from a shaft 58 so that this fan sucks the material up the tube 59 from a screw feed conveyor 60 to which it is fed through the chamber 61 from the hopper 62, the material in this case being drawn upwardly by the air current and distributed into the tubes 52 in a uniform manner.

The drive to the shaft 64 of the screw feed device 60 is by means of a pair of stepped pulleys 65 and 66 connected by a belt 67, the stepped pulley 66 being mounted on a shaft 68 driven by means of bevel gears 69 from the shaft 58 previously referred to.

The shaft 58 is driven by means of a flexible drive connection 70 from any suitable drive mechanism.

Figure 2:
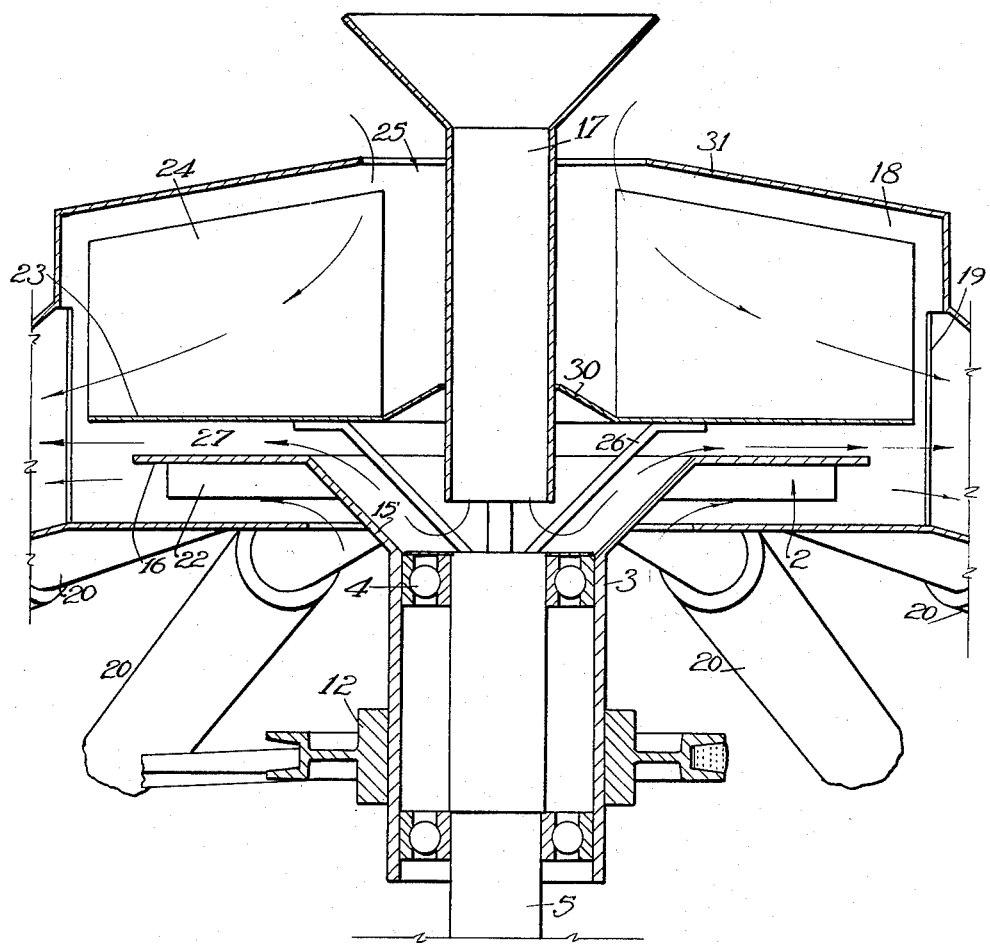
Fig. 2 is an enlarged view of the spinner and bowl.
Figure 3:
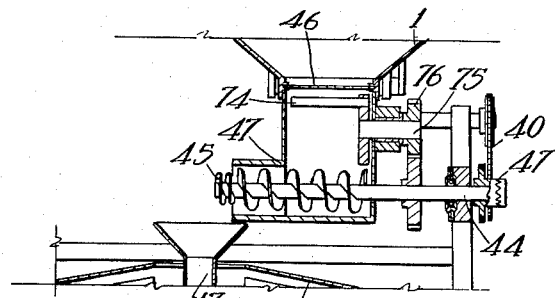
Fig. 3 is a fragmentary view of the feed part thereof.

The last said embodiment which is described with reference to Fig. 4 is arranged principally to deal with such materials as are sufficiently light that they can be readily lifted by an air current and could not then so easily be handled by the device described with reference to Figs. 1 to 3 inclusive.

In the first described embodiment an agitator 73 comprising a pin 74 on a disc on a shaft 75 ensures a constant feed to the worm 45, the shaft 75 being driven by gears 76 from the worm shaft 44.

The invention thus provides simple units which can be easily mounted on a machine and which do away with the numerous distributors previously required, the advantages being that all variety of seeds can be sown by this invention from heavy grain to the lightest buffle grass. The quantity of grain or feed can be very accurately controlled by the speed of the feed to the distributor.

If desired the bowl can be interchangeable so that one having a different number of chutes 20 and consequently tubes 28 connected thereto can replace that in use, these variations allowing the device to be used on different machines or for different materials and allowing the operator to readily choose the number of discharge points which he requires, the particular arrangement ensuring very accurate distribution as the revolving distributor members either the conical distributor member 5 on the spinner 2, or the fan-like member 53 in Fig. 4, to lodge the materials in the radiating distributor tubes 28 and 52 by means of which the materials are then conveyed to the discharge locality by the air stream flowing through same.

The hopper 1 is tiltable about the pivot pin 80 as shown dotted in Fig. 1 to allow the content to be discharged and replaced if desired, and also to allow cleaning.

What we claim is:

Distributor means for grain or other granular material comprising a support, a hopper on said support and adapted to contain material, feed means on the said hopper and including a tube through which to discharge the material, a spinner in the path of the material discharged from the said hopper, said spinner comprising a centrally apertured disc including a central depending conical distributor, a shaft carrying the said spinner, a bowl encircling said spinner and carried by the said support, fan blades on said disc, distributor tubes leading from the periphery of the said bowl to discharge points, a disc above said spinner and spaced therefrom, fan blades on the top of the latter said disc, the latter said disc being provided with a central aperture to surround the said tube, the material being fed into said conical distributor to climb the walls thereof and discharge in distributed manner at the top of the disc of the said spinner, the fan blades above said spinner drawing air into said bowl and forcing it through said distributor tubes to carry the material alongside the tubes.

References Cited in the file of this patent

UNITED STATES PATENTS

| Re. 19,801 | Mosgrove | Dec. 31, 1935 |
| 453,330 | Tyden et al. | June 2, 1891 |
| 1,171,883 | Ray | Feb. 15, 1916 |
| 1,260,808 | Reed | Mar. 26, 1918 |
| 1,302,428 | Pereda | Apr. 29, 1919 |
| 2,334,376 | Bauer | Nov. 16, 1943 |
| 2,573,784 | Asbury | Nov. 6, 1951 |
| 2,601,534 | Laffoon | June 24, 1952 |
| 2,755,002 | Gustafson | July 17, 1956 |
| 2,783,921 | Stokland | Mar. 5, 1957 |
| 2,812,732 | Meisdalen | Nov. 12, 1957 |

FOREIGN PATENTS

| 1,010,656 | France | Mar. 26, 1952 |